United States Patent [19]

Valdex

[11] 3,891,043
[45] June 24, 1975

[54] SELF-PROPELLED EARTH MOVING DEVICE

[76] Inventor: George L. Valdex, 3374 E. Pennsylvania Ave., Tucson, Ariz. 85714

[22] Filed: May 8, 1974

[21] Appl. No.: 467,914

[52] U.S. Cl.................. 180/13; 180/19 R; 280/32.7; 298/3
[51] Int. Cl............................................. B62d 53/02
[58] Field of Search.................... 180/19 R, 13, 26; 280/47.18, 32.7; 298/2, 3

[56] References Cited
UNITED STATES PATENTS

| | | | |
|---|---|---|---|
| 2,253,288 | 8/1941 | DeLucchi | 180/19 R |
| 2,354,576 | 7/1944 | Clark | 180/19 R |
| 2,533,549 | 12/1950 | Bell | 298/2 |
| 2,740,462 | 4/1956 | Stegeman | 180/19 R |
| 2,867,449 | 1/1959 | Shawver | 280/47.18 |

Primary Examiner—Robert R. Song
Assistant Examiner—John A. Pekar
Attorney, Agent, or Firm—Cahill, Sutton & Thomas

[57] ABSTRACT

A self-propelled wheelbarrow having an attachable swiveling carrier for the operator is disclosed.

The motor and fuel tank of the wheelbarrow are attached to a mounting member below the bucket and confined within the lateral dimensions of the bucket. The carrier includes a pair of wheels, a seat positioned rearwardly of the wheel axis, and a forwardly extending tongue which is attached to the wheelbarrow by a connection which permits articulation about a vertical axis and slight vertical movement of the extremity of the tongue with respect to the wheelbarrow. The limited vertical movement afforded by the connection permits the legs of the wheelbarrow to engage the ground during the non-operational mode of the device, and permits the operator to selectively lift or lower the legs by shifting his weight rearwardly or forwardly, respectively.

5 Claims, 5 Drawing Figures

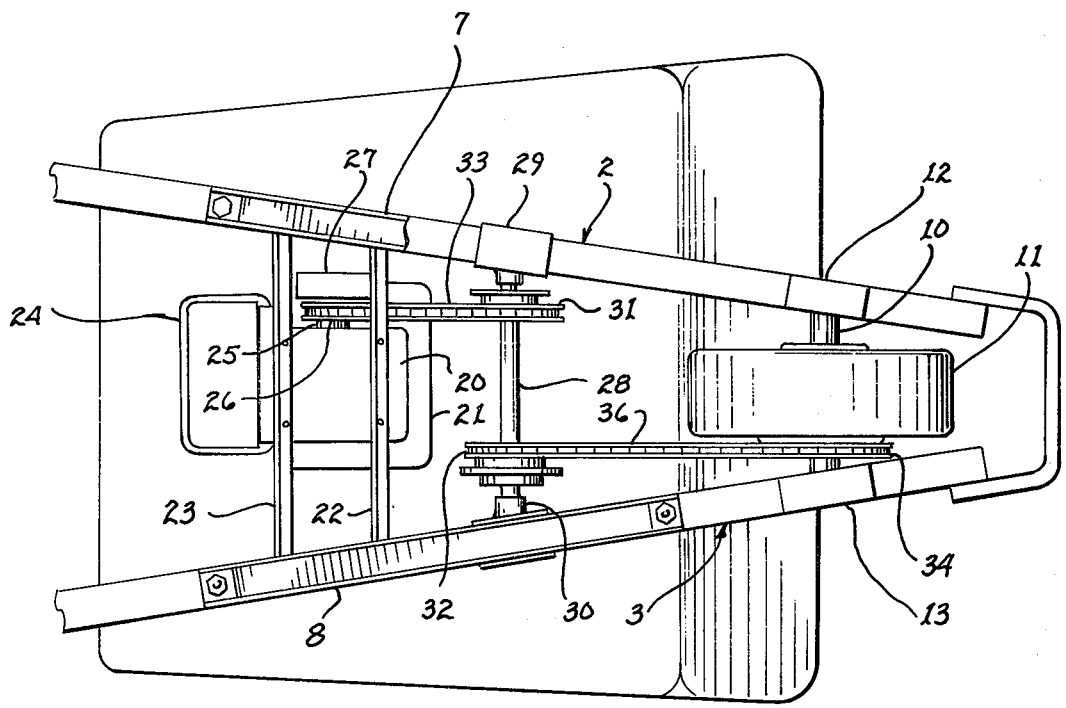
fig. 3
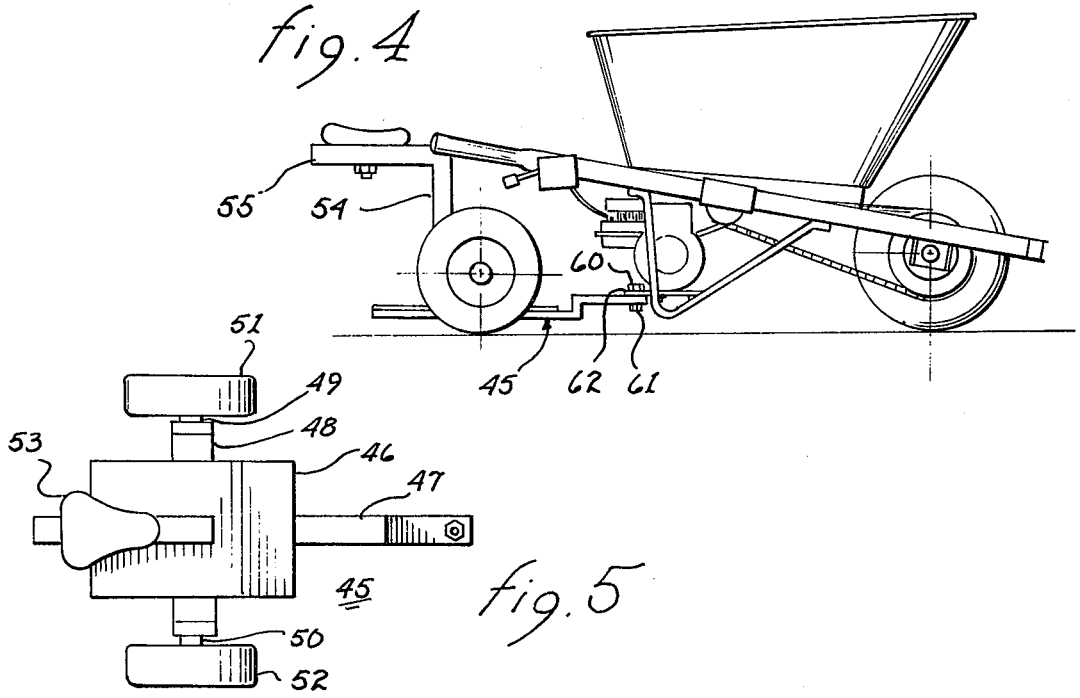
fig. 4
fig. 5

SELF-PROPELLED EARTH MOVING DEVICE

The present invention relates to earth moving equipment, and, more particularly, to manually guided self-propelled vehicles.

For centuries man has attempted to develop various devices for aiding him in moving goods and equipment from one location to another. One of the very earliest evolvements of such vehicles was the familiar wheelbarrow. It was then, and still is, one of the most useful vehicles for transportation across rough terrain in that it is highly maneuverable, requires only a single wheel and hence only a narrow passable strip of ground, has good clearance, and can carry a load commensurate with the strength of the operator. Despite this myriad of benefits, the wheelbarrow, in essence, has remained essentially unaltered despite technological advances in other areas.

Various efforts have, however, been made to provide motorized manually directed carriers. U.S. Pat. Nos. 3,055,449 and 3,212,595 teach litters incorporating a motorized single large diameter wheel to aid in transporting an injured person across uneven terrain. A somewhat related device is shown in U.S. Pat. Nos. 2,856,017 and 3,007,536, wherein a single large wheel and motor are mounted at the apex of an A-frame like carrier. This carrier is intended to be used for transporting camping gear into and out of the woods. U.S. Pat. No. 2,744,735 illustrates a cement mixer mounted upon a two-wheeled frame. The wheels and mixer are powered by an engine mounted ahead of the axle for the wheels. U.S. Pat. No. 3,485,314, discloses a powered two-wheeled carrier having an attachable self supported riding platform for the operator.

Most of the above described powered vehicles are made awkward to handle by the attached power unit. Hence, their maneuverability has been impeded and in some cases the vehicles are suitable only for use on smooth surfaces. Where a pair of driving wheels are employed, the terrain must be relatively smooth to preclude contact between the intermediate axle and the terrain; or, a path must be graded which is of a width at least equivalent to the width of the two wheels.

It is therefore a primary object of the present invention to provide a highly maneuverable manually directed single wheeled powered vehicle.

Another object of the present invention is to provide a powered unit for a wheelbarrow which does not impede or restrict the operability of the wheelbarrow.

Yet another object of the present invention is to provide a powered wheelbarrow useable at unimproved construction sites.

Yet another object of the present invention is to provide a powered wheelbarrow having a pivotable riding attachment which does not impede the operability of the wheelbarrow.

A further object of the present invention is to provide a hitch intermediate a powered wheelbarrow and a riding platform which ensures ground contact of the legs of the wheelbarrow when the platform is not occupied.

A yet further object of the present invention is to provide a riding platform for a powered wheelbarrow which platform automatically raises the legs of the wheelbarrow to permit forward movement whenever the riding platform is occupied.

These and other objects of the present invention will become apparent to those skilled in the art as the description thereof proceeds.

The present invention may be described with greater specificity and clarity with reference to the following figures, in which:

FIG. 3 is a bottom view of the present invention taken upon lines 3—3, as shown in FIG. 2.

FIG. 4 is a side view of the powered wheelbarrow and attached riding platform.

FIG. 5 is a top view of the riding platform.

Figure 1:
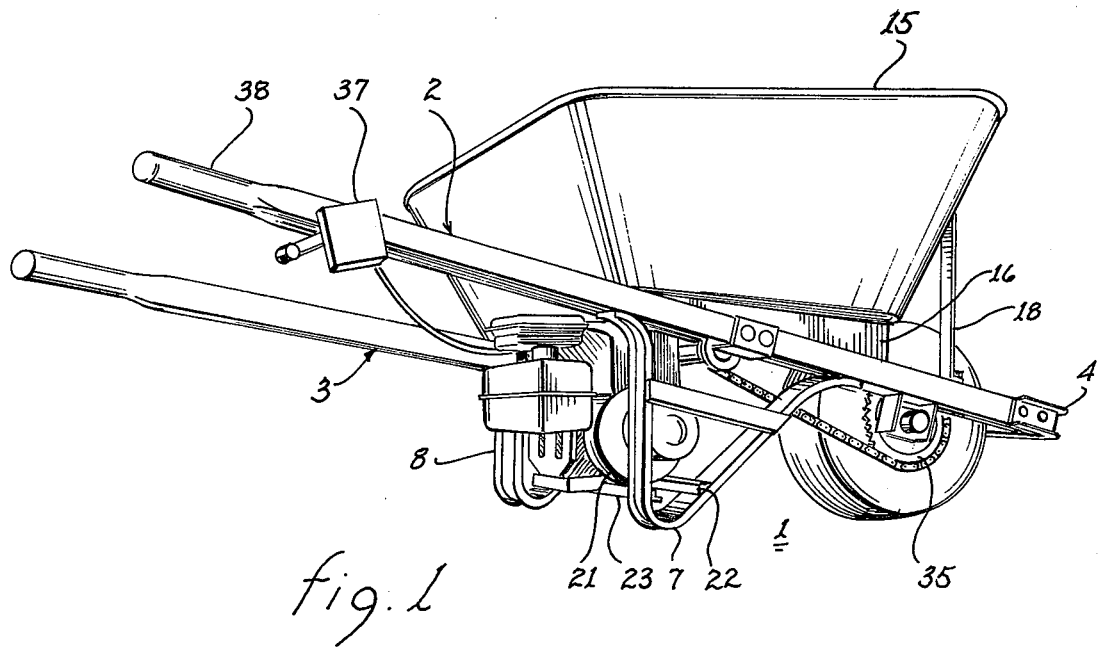
FIG. 1 is a perspective view of the present invention.
Figure 2:
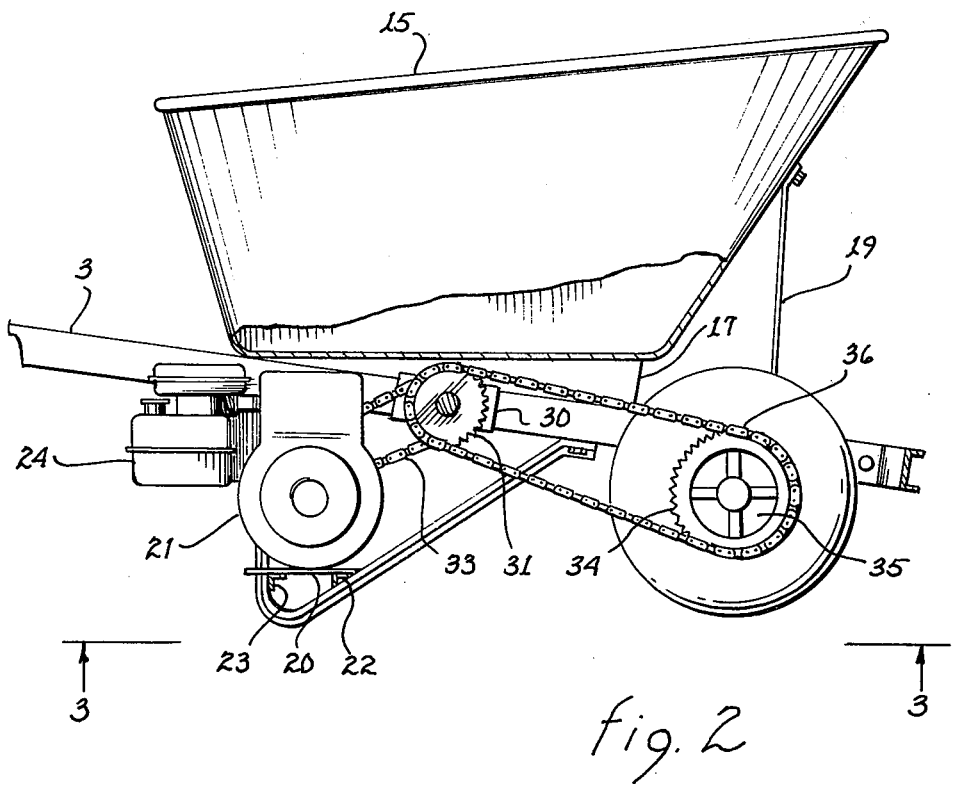
FIG. 2 is a side view of the driving mechanism of the present invention.

The powered wheelbarrow 1 is generally illustrated in perspective view in FIG. 1 and a description of the structure and functional features thereof will be described with joint reference to FIGS. 1, 2 and 3. The primary framework is formed by a pair of longitudinal members 2 and 3 joined at one end to one another by means of a U-shaped channel piece 4. A pair of triangular shaped legs 7 and 8 are bolted to the lower side of members 2 and 3, respectively. These legs serve as two ground support points for the framework. The axle 10 of a wheel 11 is connected to members 2 and 3 by means of pillow blocks 12 and 13 or the like, in proximity to the apex of the framework. Thereby, the legs 7 and 8 and wheel 11 define a stable three point ground contact when the wheelbarrow is at rest. A bucket 15 is secured to members 2 and 3 by triangular shaped supports 16 and 17 and straps 18 and 19.

A pair of angle irons 22 and 23 are welded to legs 7 and 8 to form the base for a mounting plate 20. A motor 21, which may be a small two cycle internal combustion engine, is attached to mounting plate 20 intermediate legs 7 and 8. As particularly illustrated in FIG. 3, the motor 21 is disposed beneath bucket 15 and intermediate legs 7 and 8 such that it is fully contained within the vertical envelope defined by the perimeter of the bucket. The fuel tank 24 is located intermediate members 2 and 3 at the rear of bucket 15 essentially within the lateral dimensions of the bucket as shown in FIG. 3. In this position, the fuel tank is readily accessible for filling and yet does not obstruct normal use of the wheelbarrow.

The output shaft 25 of motor 21 drives a sprocket 26 through a centrifugal clutch 27. A shaft 28 is rotatably mounted intermediate members 2 and 3 by journals 29 and 30. Two further sprockets 31 and 33 are non-rotatably secured to shaft 28, whereby independent rotation of the sprockets is precluded. A chain 33 interconnects output sprocket 26 with sprocket 31 to rotate shaft 28 and sprocket 32. A drive sprocket 34 is non-rotatably secured to hub 35 of wheel 11. A further chain 36 interconnects sprocket 32 and drive sprocket 34. It may therefore be appreciated that output sprocket 26 drives wheel 11 via clutch 27, chain 33, sprocket 31, shaft 28, sprocket 32 and chain 36.

The controls 37 for motor 21 are mounted upon member 2 in proximity to hand grip 38. Thereby, the operator, while maneuvering wheelbarrow 1 has ready access to the controls 37 without removing his hand from the hand grip.

It may be appreciated by those skilled in the art that the above described manner of mounting motor 20 and the transmission intermediate the motor and wheel 11 do not functionally impinge upon or in any manner restrict the expected maneuverability of the wheelbarrow. As the motor and attached transmission are essentially shielded by bucket 15, they will not be contaminated with falling particles during loading or unloading of the bucket. Yet, these elements are readily accessible for maintenance or repair.

Construction sites, particularly during the initial preparation of the site, are rutted, hilly and include a great deal of natural and man-made debris. Normally, the load carried by a wheelbarrow must be matched with the terrain over which the wheelbarrow is to be moved and the strength of the operator. Should the size of the load be over estimated, the operator often fails to maintain the wheelbarrow in balance, resulting in upset of the wheelbarrow and loss of at least a partial load. This causes delays, short tempers and general frustration, all of which are detrimental to efficiency. With the present invention, however, sufficient power is available to transport the wheelbarrow up hills, through soft ground and brush, and around obstacles regardless of the physical strength of the operator. Further, the bucket 15 may be loaded to its fullest capacity and thereby maintain an optimum utilization factor.

Referring now jointly to FIGS. 4 and 5, the riding platform 45 will be described in greater detail. A base 46 is welded or otherwise rigidly attached to a U-shaped cradle 48. A pair of shafts 49 and 59 extend outwardly from the upper extremities of the cradle and serve as axles for wheels 51 and 52, respectively. A tongue 47 extends forwardly from base 46. The tongue is secured to mounting plate 20, or, in the alternative, angle iron 23, by bolt 60 and nut 61. A coil spring 62 is disposed intermediate tongue 47 and mounting plate 20. The coil spring permits slight vertical movement of the extremity of tongue 47 with respect to mounting plate 20 such that a degree of articulation in the vertical axis therebetween is possible. A post 54 extends upwardly from base 46 and includes an extension 55 upon which seat 53 is mounted.

While the length of tongue 47 in the position of seat 53 are not critical, it may be appreciated that they should be configured so as to permit the operator to be comfortably seated with his feet upon base 46 and grasp the hand grips of members 2 and 3 in a comfortable manner. Further, the seat 53 should be sufficiently rearward of the extremities of members 2 and 3 so that the operator's legs will not impede lateral pivotal movement of the members.

During the non-operational mode of the present invention as shown in FIGS. 4 and 5, the weight of the wheelbarrow and the riding platform 45 will cause legs 7 and 8 to drop downwardly until they rest upon the ground. In this position, neither the wheelbarrow nor the platform will tend to roll even if parked upon a grade. When the operator seats himself upon seat 53, a substantial part of his weight will be to the rear of wheels 51 and 52 to counteract the downward force exerted upon legs 7 and 8. By grasping the hand grips of members 2 and 3, in combination with a shifting of his weight, the operator can easily and readily control the amount of upward movement of legs 7 and 8, regardless of the weight of the load carried within bucket 15. Once the legs 7 and 8 are no longer in contact with the ground, the operator can manipulate controls 37 to initiate forward movement. The direction of forward movement is readily and easily controlled by simply pivoting the wheelbarrow 1 to the left or right with respect to the trailing platform 45. Where very sharp turns are to be encountered, it may be necessary for the operator to stand, rather than sit upon the platform in order that he have sufficient reach to swing members 2 and 3 laterally.

When traversing steep hills, legs 7 and 8 can be used as effective brakes by simply having the operator shift his weight forwardly to allow the legs to descend. This technique can be used if there is a loss of power when going up hill or when going down hill at a too fast rate.

As the invention as shown in FIGS. 4 and 5 utilizes principles of leverage to lift legs 7 and 8 off the ground, great physical strength is not necessary to transport heavy loads. Further, the powered front wheel 11 permits even steep grades to be traversed as the operator need not push or pull the loads up hill.

It may therefore be evident to knowledgeable construction workers, that the invention permits construction workers who are not endowed with great strength and limited skills to be gainfully employed.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In a single wheel manually directed vehicle for transporting material over smooth or rough terrain, said vehicle including an A-frame shaped framework having an apex and a pair of hand grips extending rearwardly therefrom, a single wheel rotatably secured in proximity to the apex, a pair of legs depending from the framework intermediate the wheel and the hand grips and a bucket mounted upon the framework for carrying material and extending laterally coincident with the legs and at least partially laterally coincident with the wheel, the improvement comprising in combination:
   a. mounting means extending intermediate the legs beneath the framework at or below the center of gravity of said vehicle;
   b. a motor attached to said mounting means at the approximate center of gravity of said vehicle, said motor including an output shaft and a fuel tank, said motor, said output shaft and said fuel tank being shielded in the vertical axis by the bucket;
   c. a front wheel sprocket secured to the wheel;
   d. a drive train disposed intermediate said output shaft and said front wheel sprocket for driving the wheel in response to energization of said motor, said gear means being fully shielded in the vertical axis by the bucket;
   e. a clutch for disengaging said drive train, said clutch being disposed within the confines of the framework;
   f. said drive train including:
      1. a further sprocket attached to said output shaft via said clutch; and
      2. a shaft rotatably secured to the framework intermediate said further sprocket and said front wheel sprocket, a first and second sprocket fixedly attached to said shaft, said first sprocket being in general alignment with said further sprocket and second sprocket being in general alignment with said front wheel sprocket; and, chain means disposed intermediate said further sprocket and said first sprocket and intermediate said second sprocket and said front wheel sprocket for interconnecting said further sprocket with said front wheel sprocket; and g. means secured to one of the hand grips for regulating the operation of said motor; whereby, said motor and said drive train providing motive power for said vehicle without extending laterally beyond the lateral dimensions of the bucket and without impeding the maneuverability or passage of said vehicle over rough terrain.

2. In a single wheel manually directed vehicle for transporting material over smooth or rough terrain, said vehicle including an A-frame shaped framework having an apex and a pair of hand grips extending rearwardly therefrom, a single wheel rotatably secured in proximity to the apex, a pair of legs depending from the framework intermediate the wheel and the hand grips and a bucket mounted upon the framework for carrying material and extending laterally coincident with the legs and at least partially laterally coincident with the wheel, the improvement comprising in combination:

a. mounting means extending intermediate the legs beneath the framework at or below the center of gravity of said vehicle;

b. a motor attached to said mounting means at the approximate center of gravity of said vehicle, said motor including an output shaft, said motor and said output shaft being shielded in the vertical axis by the bucket;

c. a front wheel sprocket secured to the wheel;

d. a drive train disposed intermediate said output shaft and said front wheel sprocket for driving the wheel in response to energization of said motor, said gear means being fully shielded in the vertical axis by the bucket;

e. means secured to one of the hand grips for regulating the operation of said motor;

f. a platform mounted upon a pair of wheels for supporting an operator of said vehicle;

g. a tongue extending forwardly from said platform;

h. nut and bolt means for connecting said tongue to said mounting plate, said nut and bolt means including pivot means for accommodating pivotal movement of said tongue in the horizontal and vertical plane; and i. means for supporting the operator upon said platform rearwardly of said pair of wheels; whereby, the operator of said vehicle is transported by said vehicle in a manner such that the weight of the operator will tend to exert an upward force acting through said tongue upon said mounting plate to lift the legs of said vehicle off the ground without impeding lateral relative pivotal movement between said vehicle and said platform.

3. The improvement as set forth in claim 2 wherein said platform is secured to the base of a cradle; said cradle including a shaft extending laterally outwardly from each upper extremity of said cradle, each said shaft serving as an axle for one of said pair of wheels; whereby, the center of gravity of said platform is maintained below the axis of rotation of said pair of wheels.

4. The improvement as set forth in claim 3 including a post extending upwardly from said platform and a seat secured to said post to permit the operator to remain seated while operating said vehicle.

5. The improvement as set forth in claim 4 wherein said nut and bolt means are segregable to permit selective attachment of said platform.

* * * * *

UNITED STATES PATENT OFFICE
CERTIFICATE OF CORRECTION

Patent No. 3,891,043     Dated May 8, 1974

Inventor(s) George L. Valdez

It is certified that error appears in the above-identified patent and that said Letters Patent are hereby corrected as shown below:

Inventor's name should read -- George L. Valdez --.

Signed and Sealed this thirtieth Day of September 1975

[SEAL]

Attest:

RUTH C. MASON
Attesting Officer

C. MARSHALL DANN
Commissioner of Patents and Trademarks